June 14, 1932. J. S. REID 1,862,705

FLUTED CHANNEL

Filed July 17, 1930

INVENTOR
James S. Reid

BY

Brockett, Hyde, Higley & Meyer
ATTORNEYS

Patented June 14, 1932

1,862,705

UNITED STATES PATENT OFFICE

JAMES S. REID, OF SHAKER HEIGHTS, OHIO, ASSIGNOR TO THE REID PRODUCTS COMPANY, OF CLEVELAND, OHIO, A CORPORATION OF OHIO

FLUTED CHANNEL

Application filed July 17, 1930. Serial No. 468,676.

The invention disclosed in this application relates to window channel especially adapted for the windows of automotive vehicles.

In applying window channel to window grooves it is difficult, with the body makers on the one hand and the channel makers on the other, to produce a proper fit between the walls of the groove and the channel laterally and it is well to provide for lateral yield without unduly affecting the side flanges and their proper engagement with the glass pane.

With the foregoing in mind, this invention contemplates providing the base of the channel with an upwardly extending V-shaped projection which not only acts as a spacer for the glass but provides a collapsible yielding structure at the center of the base of the channel so that the channel may give transversely through the base to permit the application of the channel to varying window grooves without affecting the predetermined tension upon the side flanges and their predetermined grip upon the glass.

The invention is very well disclosed in the following description, drawing and claims.

Figure 1:
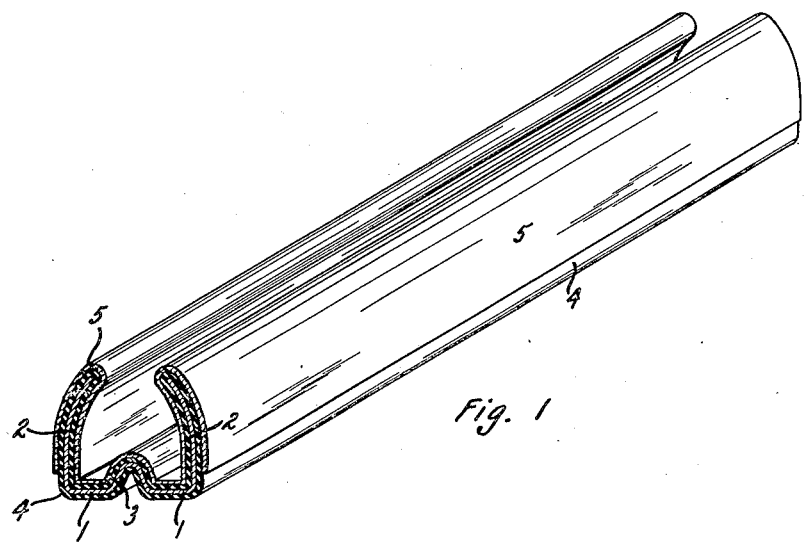
Figure 2:
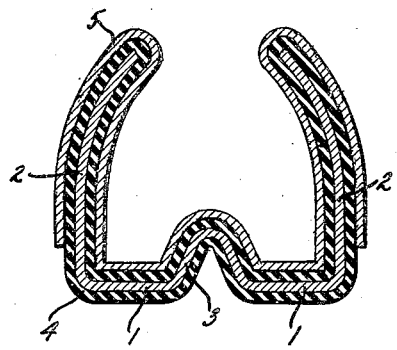

In the drawing, Fig. 1 shows a piece of channel; and Fig. 2 shows a cross section thereof.

In the embodiment shown, the channel is preferably made up of a thin sheet steel core comprising a base 1 and side flanges 2 bent at right angles thereto and curved inwardly to engage the glass.

The base is provided with an upwardly extending V-shaped member 3 which, in the structure, has sufficient lateral tension to hold the outer corners of the base in the base of the window groove and yet is sufficiently resilient to permit a considerable degree of lateral compression so that the channel may be readily applied to window grooves which vary in transverse dimensions to a considerable extent. This core is covered with a suitable soft compound coating 4, such as rubber or the like. When made of rubber it is vulcanized or otherwise treated.

Lining the inside of the channel and extending out over the edges of the side flanges and down upon the outside of the same is a suitable covering 5 of soft material, such as fabric, felt, or the like, to ease the slip of the glass and take up wear. In use the channel is applied to the window groove and yields transversely so that the lower outer right angle corners fit nicely in the groove. If the window groove should vary in width the channel will yield transversely and adapt itself to the channel.

What I claim is:

1. A window channel comprising an inner spring metal core in channel form including flat bottom portions and side flanges bent at substantially right angles thereto and curved inwardly to form glass engaging portions near their outer edges, and a suitable flute formed in the base for permitting lateral yield of the channel to adapt it to varying outer dimensions of window grooves.

2. Window channel as in claim 1 wherein the flute is formed by a V-shaped projection extending inwardly into the channel.

In testimony whereof I hereby affix my signature.

JAMES S. REID.